US006450318B1

(12) United States Patent
Minardi

(10) Patent No.: US 6,450,318 B1
(45) Date of Patent: Sep. 17, 2002

(54) OVERHEAD MONORAIL SYSTEM

(75) Inventor: Maurice Minardi, Dudley, MA (US)

(73) Assignee: TEC Engineering Corporation, Oxford, MA (US)

( * ) Notice: Subject to any disclaimer, the term of this patent is extended or adjusted under 35 U.S.C. 154(b) by 0 days.

(21) Appl. No.: 09/595,108

(22) Filed: Jun. 16, 2000

(51) Int. Cl.[7] ................................................ B65G 37/00

(52) U.S. Cl. ..................... 198/346.3; 414/940; 414/626

(58) Field of Search .................. 198/346.3; 414/222.13, 414/940, 217, 560, 561, 626, 564

(56) References Cited

U.S. PATENT DOCUMENTS

| | | | | | |
|---|---|---|---|---|---|
| 904,525 | A | * | 11/1908 | Frederick | 105/29.1 |
| 3,102,607 | A | * | 9/1963 | Roberts | 186/40 |
| 3,457,876 | A | * | 7/1969 | Holden | 104/89 |
| 3,999,630 | A | * | 12/1976 | McPhee | 186/40 |
| 4,019,605 | A | * | 4/1977 | Kropf | 186/48 |
| 4,237,011 | A | | 12/1980 | Acosta | 210/237 |
| 4,773,807 | A | | 9/1988 | Kroll et al. | 414/282 |
| 5,096,357 | A | * | 3/1992 | Galbani | 414/626 X |
| 5,397,211 | A | | 3/1995 | Lloyd et al. | 414/663 |
| 5,440,943 | A | * | 8/1995 | Holt et al. | 74/89.15 |
| 5,549,176 | A | * | 8/1996 | Hawkins | 182/63 |
| 5,568,393 | A | | 10/1996 | Ando et al. | 364/478 |
| 5,571,406 | A | * | 11/1996 | Mensching | 210/159 |
| 6,183,184 | B1 | * | 2/2001 | Shiwaku | 414/626 X |

* cited by examiner

*Primary Examiner*—Joseph D. Pape
*Assistant Examiner*—Lori L Coletta
(74) *Attorney, Agent, or Firm*—Mirick, O'Connell, DeMallie & Lougee, LLP

(57) ABSTRACT

An elevated container transport system, comprising: an elevated track; a cart movable along the track; means for moving the cart along the track; a telescoping arm coupled to the cart, and movable between a retracted position in which its distal end is relatively close to the cart, and an extended position in which the distal end is farther from the cart; and a container support structure carried by the telescoping arm and extendable and retractable therewith, preferably accomplished with two container conveyor systems.

5 Claims, 2 Drawing Sheets

OVERHEAD MONORAIL SYSTEM

FIELD OF THE INVENTION

This invention relates to a container transport system that transports empty cartons/containers from a storage location to a production area, and also retrieves the full cartons/containers from the production area, and transports them to an accumulating location

BACKGROUND OF THE INVENTION

Injection molding production floors typically require the movement of a large number of part containers onto and off of the floor. Typically, empty containers are delivered to the production machines, and full containers are picked up, by personnel driving fork trucks. However, this system requires that a fair amount of the production floor be devoted to material handling concerns only, which decreases the production capacity of the plant. Further, the system requires personnel, and machines, both of which contribute to the plant overhead.

SUMMARY OF THE INVENTION

It is therefore the primary object of this invention to provide a system that uses virtually no floor space, and automatically, without the need for personnel, delivers and removes containers from a production floor, particularly from injection molding environments.

This invention features an elevated container transport system, comprising: an elevated track; a cart movable along the track; means for moving the cart along the track; a telescoping arm coupled to the cart, and movable between a retracted position in which its distal end is relatively close to the cart, and an extended position in which the distal end is farther from the cart; and a container support structure carried by the telescoping arm and extendable and retractable therewith.

The elevated track may be a monorail. The means for moving the cart may move the cart in opposite directions along the track. The container transport structure may comprise at least one container conveyor, and preferably comprises two such conveyors.

BRIEF DESCRIPTION OF THE DRAWINGS

Other objects, features and advantages will occur to those skilled in the art from the following description of the preferred embodiment, and the accompanying drawings, in which.

DESCRIPTION OF THE PREFERRED EMBODIMENT

This invention may be accomplished in an elevated container transport system that transports empty cartons/containers from a storage location to a production area (such as an injection molding machine), and also retrieves the full cartons/containers from the production area, and transports them to an accumulating location. This is accomplished without occupying floor space as is necessary with existing transport systems.

Figure 1:
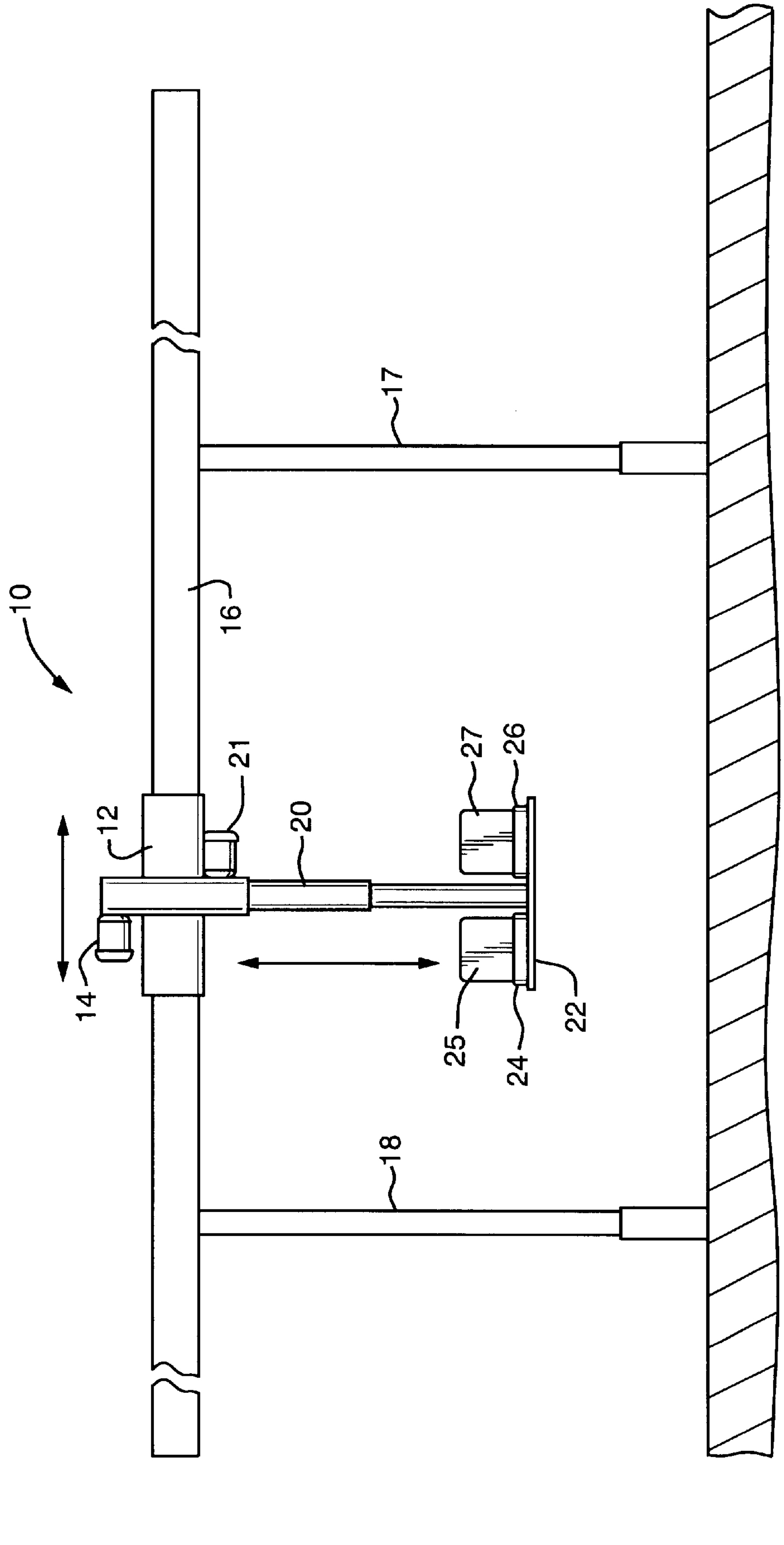
FIG. 1 is a side schematic view of a preferred embodiment of an elevated container transport system of this invention.

The preferred embodiment of the inventive system 10, FIG. 1, includes an elevated track 16, and a cart 12 movable along track 16. Reversible motor 21 moves cart 12 in both directions along track 16. Motor 21 may drive a sprocket that engages in a chain fixed to track 16, which also allows the cart position to be determined based on counting sprocket revolutions. Telescoping arm 20 is coupled to cart 12, and is movable by reversible motor 14 between a retracted position in which its distal end 23 is relatively close to cart 12, and an extended position in which the distal end is farther from the cart. Motor 14 winds a cable coupled to arm 20 to lift the arm. The arm drops by gravity. Preferably, arm 20 is square, and plastic bearings allow the three arm portions to slide within one another. The bearings can integrally include stops that define the raised and lowered positions of the arm. The motor can be used to hold the arm in an intermediate position, if desired. Container support structure 22 is carried by telescoping arm 20 and extendable and retractable therewith.

Figure 2:
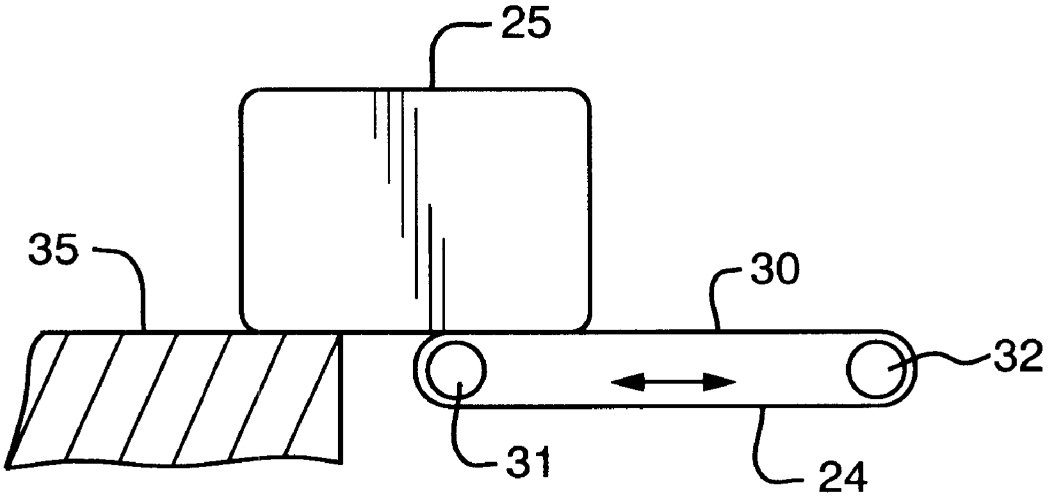
FIG. 2 is a side schematic view of a preferred conveyor comprising the container transport structure of this invention, for loading and unloading containers from the cart.

In the preferred embodiment, track 16 is a monorail supported by support columns such as columns 17 and 18, which is the only part of the system that is coupled to the production floor, thereby freeing a tremendous amount of space on the floor which can be devoted to additional production equipment. Container support structure 22 may be adapted to pick up and deliver containers as follows. Container conveyors 24 and 26 are carried on opposite sides of arm 20, themselves shown as carrying containers 25 and 27, respectively. In use, cart 12 would be remotely commanded (for example with a computerized inventory control system that automatically enabled the cart to pick up and drop off containers where necessary in the factory) to receive an empty container from the container storage area, and then move to the production floor with the telescoping arm fully retracted. Once the cart was at the proper location, arm 20 would be extended and one of conveyor systems 24 and 26 would be enabled to drop off the empty container at the correct location. FIG. 2 schematically depicts conveyor 24 having bi-directional movable belt 30 moved by a drive and idler combination 31, 32. Container 25 is in the process of being unloaded from (or loaded onto) container collection area 35. The second conveyor (or the same one in systems having only one conveyor) could be enabled to pick up a full container from the same or a proximate location.

The system of this invention does not require a monorail elevated track, does not require more than one device for unloading and loading containers, and does not require conveyor systems for doing so. For example, the elevated track and cart could be of a more standard design. The empty and full containers could be moved on to and off of the container support structure by any relevant means that is adapted to slide or pick up a container.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. An elevated container transport system, comprising:

an elevated track;

a cart movable along said track;

means for moving said cart along said track;

a telescoping arm coupled to said cart, and movable between a retracted position in which its distal end is relatively close to said cart, and an extended position in which said distal end is farther from said cart; and a container support structure comprising at least one container conveyor carried by said telescoping arm and extendable and retractable therewith.

2. The elevated container transport system of claim 1 wherein said elevated track is a monorail.

3. The elevated container transport system of claim 1 wherein said means for moving said cart moves said cart in opposite directions along said track.

4. The elevated container transport system of claim 1 wherein said container support structure comprises two container conveyors.

5. An elevated container transport system, comprising:

an elevated monorail track;

a cart movable along said track in two directions;

means for moving said cart along said track in two directions;

a telescoping arm coupled to said cart, and movable between a retracted position in which its distal end is relatively close to said cart, and an extended position in which said distal end is farther from said cart; and a container support structure carried by said telescoping arm and extendable and retractable therewith, and comprising at least one container conveyor.

* * * * *